United States Patent [19]

Maryasin et al.

[11] Patent Number: 5,282,975
[45] Date of Patent: Feb. 1, 1994

[54] REMOVAL OF OIL FROM WATER

[75] Inventors: Ilya Maryasin, Jerusalem; Enrico Sandbank; Gedaliah Shelef, both of Haifa, all of Israel

[73] Assignee: Technion Research and Development Foundation Ltd., Israel; a part interest

[21] Appl. No.: 853,937

[22] Filed: Mar. 19, 1992

Related U.S. Application Data

[63] Continuation-in-part of Ser. No. 632,171, Dec. 21, 1990, abandoned.

[30] Foreign Application Priority Data

Dec. 25, 1989 [IL] Israel .................. 092872

[51] Int. Cl.$^5$ .............. B01D 15/08; C02F 1/28
[52] U.S. Cl. .................. 210/691; 585/826; 210/694; 210/924
[58] Field of Search ............ 585/826; 210/691, 694, 210/924

[56] References Cited

U.S. PATENT DOCUMENTS

| | | | |
|---|---|---|---|
| 2,817,605 | 12/1957 | Sanz et al. | 423/448 |
| 3,338,815 | 8/1967 | Groszek | 423/448 |
| 3,357,929 | 12/1967 | Olstowski | 423/448 |
| 3,769,199 | 10/1973 | Groszek | 585/826 |
| 4,533,086 | 8/1985 | Junttila | 423/460 |
| 4,961,988 | 10/1990 | Zhu | 423/460 |

FOREIGN PATENT DOCUMENTS

| | | |
|---|---|---|
| 343483 | 11/1989 | European Pat. Off. . |
| 2605014 | 4/1988 | France . |
| 63-252978 | 10/1988 | Japan . |

OTHER PUBLICATIONS

D. D. L. Chung Journal of Material Science Dec. 22, 1987, pp. 4190–4198.

*Primary Examiner*—Gary P. Straub
*Assistant Examiner*—Stuart L. Hendrickson

[57] ABSTRACT

A hydrophobic and oleophilic particular vermicular structure of expanded graphite, possessing the property of absorbing in a selective manner only large amounts of petroleum products from a water media is described. This expanded grahite is characterized by three main properties: (a) a specific density in the range of 0.003–0.1 g/ml; (b) a surface area in the range of 50–200 $m^2g/ml$; and (c) closed pores in the range of 3% to 20%. The particular structure of the expanded graphite can be used in the form of particulate, pillows, blankets, booms or as a filter medium. Preferred particles sizes of the expanded graphite are in the range of between 0.5 to 3 mm. The oil absorbed onto the expanded grahite can be released by pressure or recovered by solvent extraction.

6 Claims, No Drawings

REMOVAL OF OIL FROM WATER

This application is a Continuation-In-Part of Ser. No. 07/632,171 filed on Dec. 21, 1990, now abandoned.

The present invention relates to a particular structural form of expanded graphite. More particularly, the invention relates to a particular structure of expanded graphite possessing the property of absorbing in a selective manner, large amounts of petroleum products from water media.

BACKGROUND OF THE INVENTION

Graphite is a well-known mineral consisting of the element carbon, crystallizing in the hexagonal system. It is black, opaque and very soft being widely used due to its property of good conductivit of electricity. It has a greasy feel and rubs off on anything it touches, leaving a black mark. As an artificial product, graphite is known as scales in gray pig iron and as graphitic powder formed in iron furnaces. It is also produced on a large scale in electric furnaces. It is widely used in refractory, as a constituent in the lubricants manufacture, foundry, brake linings, facings, packings, pencils, batteries and carbon brushes. Active carbon is well-known for its absorption property of various solvents or as a filter media. However it is unsuitable for absorption of from water, since after absorption it sinks and can not be easily removed. The same problem of sinking exists with magnesium oxide, also known for its absorption property. But, again, due to its sinking it can not be used for absorption of petroleum products on water caused by spillage.

Polyurethane foam in the form of small pieces was suggested in a recent French Pat. No. 2,605,014 to be useful for absorbing oil from water However, the absorption power of urethane is quite low and therefore the ratio of polyurethane to oil is high. Moreover, a significant part of the urethane powder is wasted.

Expanded graphite was disclosed in a number of references possessing improved properties for specific uses. Thus in a review by D.D.L. Chung [Journal of Material Science 22, (1987), p. 4190-8] expanded graphite, obtained by exfoliation, is described by a process in which graphite expands by up to hundreds of times along the "C" axis, resulting in a puffed-up material with a low density and a high temperature resistance. This type of exfoliated graphite is mentioned to be useful for high-temperature gaskets, packings, fire extinguisher agent, thermal insulator, as a conductive resin composite — in composition with a thermoplastic resin — and as a chemical reagent. It is also mentioned its use as an adsorbent for gas chromatography and as a substrate for the study of adsorbed films.

In the Japanese Patent Application No. 8869705, Kisch graphite is mixed with natural graphite at 90° C. and treated with sulfuric acid in the presence of an oxidizing agent (such as a peroxide), heated at a temperature above 800° C. and rolled into sheets. It is claimed that the resulted sheets possess high resilience and chemical resistance.

According to U.S. Pat. No. 3,357,929 a vermicular expanded graphite structure is described for absorption of various liquids, such as: water, hydrocarbons, silicones halocarbons, strong acids, strong alkalies and liquid halogens. Nothing is mentioned in this patent on a selective absorption, the data presented therein referring only on the maximum amount of various liquids absorbed by the graphite. As mentioned in Example 1, the graphite absorbs more water than any known sorption agents. As mentioned in Table 1 of this patent, the expanded graphite absorbed 46.7 g of water per gram compared with 29 gram of kerosene per gram of the same expanded graphite.

In the U.S. Pat. No. 4,961,988, a packing of expanded graphite is prepared by the embedment of organic synthetic films, glass fibers, synthetic fibers and carbon fibers. The product obtained is mentioned to be useful as a sealing material for fluid media.

According to the U.S. Pat. No. 3,338,815, a particular type of graphite having a surface area of at least $50 m^2/g$ is mentioned to possess the property of separating long-chain normal hydrocarbons having at least ten carbon atoms by a preferential absorption of a particular hydrocarbon present therein. It is further mentioned, that the hydrocarbons may be present in an organic solvent. But nothing is mentioned in this patent on the preferential absorption of the particular type of graphite of a hydrocarbon present in a water media.

It is an object of the present invention to provide a particular structure of expanded graphite possessing a selective high absorption power of petroleum products. It is another object of the present invention to provide a particular structure of expanded graphite, which has the property of absorbing in a selective manner, only petroleum products from a water media without absorbing water. It is yet another object of the present invention to provide a particular structure of expanded graphite, which after the selective absorption of petroleum products, is able subsequently to release the absorbed materials by a simple squeezing.

BRIEF DESCRIPTION OF THE INVENTION

The invention relates to a particular vermicular structure of expanded graphite possessing the following physical characteristics:

a specific density in the range of 0.003 to 0.1 g/ml.,
surface area in the range of 80 to 150 $m^2/g$., and
3% to 20% of the pores of said particles being closed, said expanded graphite being hydrophobic and oleophilic and having the property of absorbing only petroleun products at an extent of at least 32 g per g of expanded graphite from water media containing said petroleum products. The absorbed petroleum material can be easily released from the loaded expanded graphite by a simple squeezing operation.

The expanded graphite according to the present invention is most useful for absorption of petroleum products from water surfaces such as oceans, seas, and waste water reservoirs. In addition to its high absorption capacity towards the petroleum product, the expanded graphite possessing the above physical properties, does not absorb water and therefor it floats on the water and does not sink. In this manner the petroleum-loaded expanded graphite can be easily removed by mechanical means and if required, it can be recovered by squeezing. In case a complete recovery is required, a further solvent extraction operation may be applied.

It was found according to the present invention, that only when the expanded graphite possesses all the above physical properties, it will absorb in a selective manner oil products from a water media. Petroleum products removal from water surfaces is an important task required in industry as well as in maritime activities. As known, the presence of petroleum products in oceans or seas resulting from spillages of tankers carrying them, is a serious burden and most undesirable from an environmental point of view. The invention is also envisaged for a number of other uses such as: removal of hydrocarbons from industrial waste water, pesticides, etc.

A most important characteristic of the expanded graphite according to the present invention, which enables only the absorption of petroleum products in a selective manner from a water media, is the range of 3% to 20% of the pores of the graphite particles which are closed. The particles with this range of closed pores, enable after the absorption of the petroleum product, the buoyancy of the loaded graphite so that they will not sink in said water media. As known, ordinary graphite has a density of 2.2 g/ml and does sink in water. However, the expanded graphite according to the present invention, possessing the above narrow range of closed pores, enables an optimal decrease in the specific density of the said graphite, but does maintain the high selective absorption power towards the petroleum products.

The removal of petroleum products by absorption, has some important advantages over mechanical means such as traps which are commonly used. The main disadvantage of such traps, is the fact that they contain oil which constitutes a serious burden to any biological treatment and produces oily deposits in equipment and pipes.

Another aspect of the present invention, is for the recovery of valuable petroleum substances from waste water such as encountered frequently in the chemical industry. This recovery is possible due to the fact that the expanded graphite is completely inert, and the valuable substances absorbed can be easily released and recovered by squeezing at a moderate pressure. If necessary, and especially if it is economically, the remaining petroleum products can be recovered by solvent extraction.

The physical properties of the expanded graphite in order to be useful for the present invention are:
Specific density in the range of 0.003-0.1 g/ml and most preferable in the range of 0.005-0.002 g/ml.
Surface area in the range of 50-200 $m^2/g$ and most preferable in the range of 80-150 $m^2/g$.
Closed pores in the range of 3-20% and most preferable in the range of 8%-10%.

An important characteristic of the expanded graphite is the fact that it does not pollute water and floats on the water. This is connected with the characteristic features that up to 20% of its pores are closed.

The amount of expanded graphite to be spread on the water depends, of course, on the amount of petroleum product to be collected from the water. Generally, this amount is in the range of between 1 g and 100 g per square meter of the water area. The equipment useful for spreading the expanded graphite may be selected from known machines such as employed in agriculture or in fire extinguishing equipment. The time of contact required for an efficient absorption by the expanded graphite varies between 15 minutes to several hours, depending on the particular type of petroleum product.

The expanded graphite can be spread on the surface of the water in the form of granules, or any other particulate form. It can also be used in pillows, blankets or booms which are permeable to water and contain the expanded graphite particles.

In case of industrial wastes, it is suggested to convey the waste into a column filled with pulverized expanded graphite, as an upflow stream.

The expanded graphite, possessing the physical properties according to the present invention, can also be utilized as a filter medium. This filter medium can be obtained by pressing the particles of expanded graphite at a pressure in the range of between 50 to 100 $g/cm^2$ producing a layered sheet.

The expanded graphite according to the present invention, is obtained by a process which involves the two following steps. In the first step, raw graphite particles are oxidized using an acidic medium. A typical example is the oxidation by an alkali dichromate in a solution of sulfuric acid. In the second step, the resulting product from the previous step is heated at a temperature above 800° C. and preferably above 900° C. From the resulting product, the particles having a size in the range of 0.5 to 3 mm are separated, their physical properties being in the range useful for the present invention as mentioned above.

The invention will be hereafter illustrated by a number of Examples, being understood that no limitation should be deduced, the Examples being presented only for a better understanding of the invention as given in the above description.

EXAMPLE 1

Graphite particles in the range of 0.1 to 0.2 mm were treated with a concentrated solution of sodium dichromate mixed with sulfuric acid.

The solid particles were separated, washed with water from the acidic adhered solution and dried.

The treated graphite particles were heated at 900° C. for one minute.

The particles having a size in the range of 0.5-3 mm were removed by screening and found to possess the following physical properties:
surface area: 150 $m^2/g$
specific density: 0.005 g/ml.
closed pores: 15%.

Particles of the expanded graphite as treated above were spread at a rate of 1 $mg/cm^2$ over a basin of water which contained on the surface a mineral oil of a density of 0.866 g/ml). The volume ratio oil: water was 1:50.

It was found that the particles of the loaded expanded graphite collected from the surface of the basin absorbed 49 g of mineral oil per gram of graphite.

EXAMPLE 2

The experiment as in Example 1 was repeated, wherein the same expanded graphite particles were spread over a basin of water containing kerosene on the surface.

It was found that the loaded expanded graphite particles separated, contained 32.7 g kerosene and 0.9 g water per gram of expanded graphite.

EXAMPLE 3

Expanded graphite particles, as prepared in Example 1, were compressed at a pressure of 50 kg/cm obtaining a filter sheet. The filter sheet was inserted in a vertical column, and an aqueous emulsion upflow, containing 2% light crude oil, was passed through it.

It was found that the sheet contained 52.0 g of the oil per gram of the graphite and only traces of water.

EXAMPLE 4

The experiment as in Example 1 was repeated, wherein the same expanded graphite particles were spread over a basin of water containing engine oil.

It was found that the loaded expanded graphite particles separated contained 40.6 g of the oil and 1.9 g water per gram of expanded graphite.

We claim:

1. A method for using a particular vermicular structure of expanded graphite particles for a selective absorption of petroleum products from a water media, said method comprising contacting said water media containing petroleum products with said expanded graphite particles, said expanded graphite particles possessing the following physical characteristics:

a specific density in the range of 0.003-0.1 g/ml;
a surface area in the range of 50 to 200 m$^2$/g and 3% to 20% of the pores of said particles being closed said expanded graphite particles being hydrophobic and oleophilic and having the property of absorbing only petroleum products from said water media at an extent of at least 32 g petroleum products per gram of expanded graphite particles.

2. The method according to claim 1, wherein the expanded graphite particles have a specific density in the range of 0.005-0.02 g/ml, a surface area in the range of 80-150 m$^2$/g and closed pores in the range of 8%-10%.

3. The method according to claim 1, wherein the expanded graphite particles have an average diameter size in the range of 0.5-3 mm.

4. The method according to claim 1, wherein the expanded graphite particles are formed into pillows, blankets or booms which are then spread on the water media.

5. The method according to claim 1, wherein the oil absorbed onto the expanded graphite particles is recovered by applying pressure on the loaded graphite.

6. The method according to claim 1, wherein the oil absorbed onto the expanded graphite particles is recovered by solvent extraction.

* * * * *